United States Patent [19]
Yamada

[11] Patent Number: 4,884,103
[45] Date of Patent: Nov. 28, 1989

[54] PROGRAMMED CONTROL DEVICE FOR COPYING MACHINES AND THE LIKE

[75] Inventor: Hirokazu Yamada, Toyohashi, Japan

[73] Assignee: Minolta Camera Kabushiki Kaisha, Osaka, Japan

[21] Appl. No.: 109,085

[22] Filed: Oct. 15, 1987

[30] Foreign Application Priority Data
Oct. 17, 1986 [JP] Japan ................................ 61-248233

[51] Int. Cl.⁴ .......................................... G03G 15/00
[52] U.S. Cl. .................................................. 355/200
[58] Field of Search ................... 355/14 R, 14 C, 200, 355/204

[56] References Cited
U.S. PATENT DOCUMENTS
4,711,560 12/1987 Hosaka et al. ...................... 355/200

FOREIGN PATENT DOCUMENTS
60-60661  4/1985  Japan ................................. 355/14 C
60-263958 12/1985 Japan ................................. 355/14 C
61-23167  1/1986  Japan ................................. 355/14 C
61-27783  6/1986  Japan .

Primary Examiner—Arthur T. Grimley
Assistant Examiner—J. Pendegrass
Attorney, Agent, or Firm—Price, Gess & Ubell

[57] ABSTRACT

A programmed control device capable of connecting an external memory including a program to be used as a substitute of a main program of the device. The control device and the external memory to be connected thereto have the same data, respectively, to confirm the connection of adequate external memory.

7 Claims, 4 Drawing Sheets

PROGRAMMED CONTROL DEVICE FOR COPYING MACHINES AND THE LIKE

FIELD OF THE INVENTION

The present invention relates to a programmed control device for controlling copying machines and the like according to a program incorporated therein.

BACKGROUND OF THE INVENTION

In recent years, copying machines, laser printers and the like are controlled by a microcomputer (hereinafter referred to as "MC") including a central processing unit (hereinafter referred to as "CPU"), a read-only memory (hereinafter referred to as "ROM") and a random access memory (hereinafter referred to as "RAM") which is amenable to data reading and writing.

The ROM has stored therein the program to be used for the control and it is usually in the form of a mask ROM. As shown in FIG. 1, the program stored in such a ROM includes a reset-start address with a jump destination address written therein for reset-start, a routine for initialization, a routine for an interruption, a main routine for controlling a copying system or the like generally in its entirety, and subroutines for specifically controlling individual functions, etc. The power supply or reset switch, when turned on, permits the MC to read out the program first at the reset-start address (0000H address). The head address of the main routine is written in the reset-start address, and the flow of the program jumps to the main routine. Within the main routine, the initialization routine and subroutines are suitably called, and while upon request for an interruption, the interruption routine concerned is executed.

With such MCs, it is likely that a bug will be found in the program within the ROM, or it may be desired to alter the program or to add some routine thereto for a change in the specifications of the copying system or for an improvement in its function. It then becomes necessary to replace the entire memory chip, or when the ROM is in the form of a mask ROM included in a one-chip MC, the one-chip MC must be replaced in its entirety, hence a very great loss can occur.

On the other hand, it has been proposed to use as attached to an internal ROM, an external ROM wherein a program for performing a specified function is stored as a subroutine and which is available as an option as shown in FIG. 2 (Examined Japanese Patent Publication SHO 61-27783 or Unexamined Japanese Patent Publication SHO 61-23167). According to the proposal, the main routine in the internal ROM is used as such although the specified function can be added to the contemplated system, so that it is impossible to make a change in the specifications of the system if the change is relevant to the main routine or to debug the main routine.

SUMMARY OF THE INVENTION

Accordingly, an object of the present invention is to provide an improved programmed control device.

Another object of the invention is to provide a programmed control device which is adapted to connect thereto a ROM having stored therein a program including a main routine.

These and other objects of the invention can be achieved by making it possible to connect to a microcomputer having an internal ROM an external ROM containing a main routine which is usable instead of the main routine in the internal ROM, and causing the internal ROM to store therein a program arranged to detect whether the external ROM is connected to the microcomputer and further arranged to use the main routine of the external ROM when the external ROM is connected.

More specifically stated, the internal ROM and the external ROM are made to have common data at respective specified addresses, and the connection of the external ROM is detected depending on whether the data at one of the addresses coincides with the data at the other address.

BRIEF DESCRIPTION OF THE DRAWINGS

These and other objects or features of the present invention will become apparent from the following description of preferred embodiments thereof taken in conjunction with the accompanying drawings, in which.

DESCRIPTION OF THE PREFERRED EMBODIMENTS

Embodiments of the invention will be described below with reference to the drawings.

In the following description, like parts are designated by like reference numbers throughout the several drawings.

Figure 1:
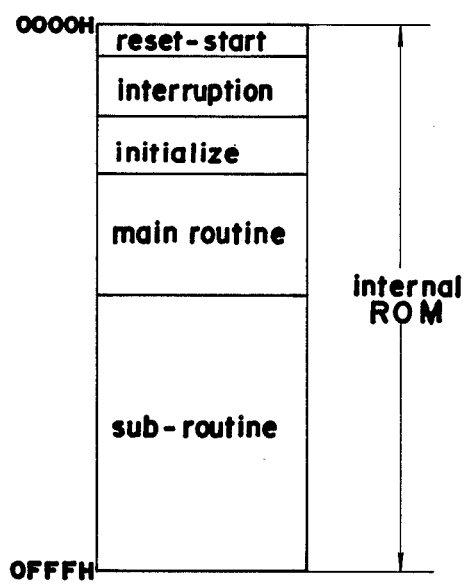
FIG. 1 is a diagram showing a program structure in the internal ROM of a common microcomputer.
Figure 2:
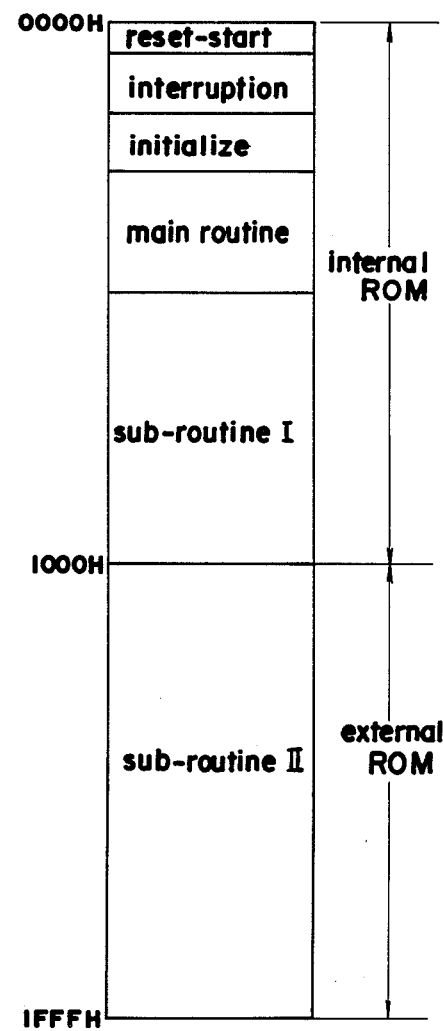
FIG. 2 is a diagram showing a program structure in a conventional microcomputer system including an external ROM and an internal ROM.
Figure 3:
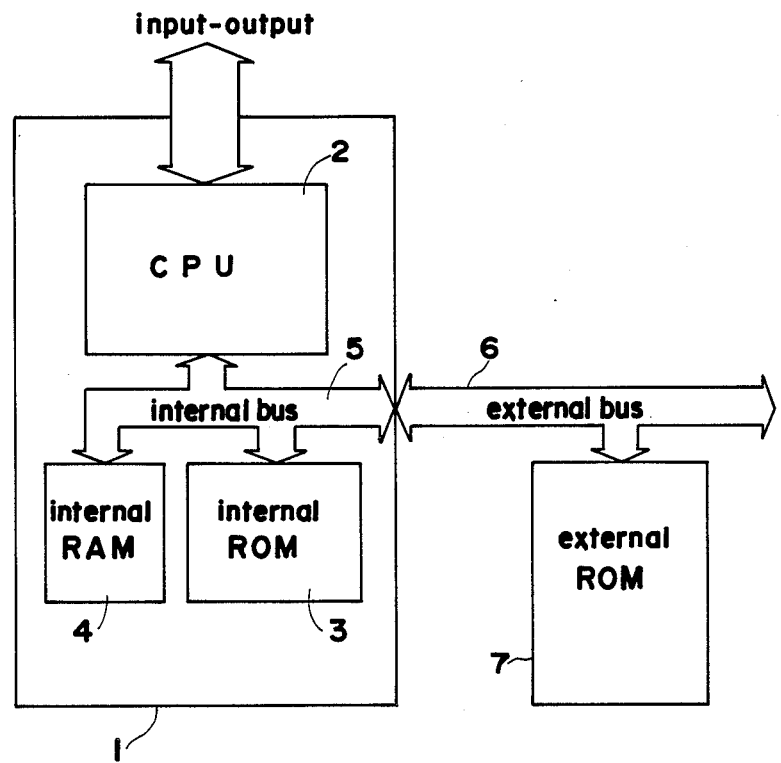
FIG. 3 is a diagram showing the construction of a microcomputer system embodying the invention.

With reference to FIG. 3, a microcomputer 1 has a CPU 2, an internal ROM 3 and a RAM 4 which are assembled together. These components are interconnected by an internal bus 5, while the CPU 2 has an input-output bus for controlling an external load therethrough. The internal bus 5 is connected to an external bus 6 having connected thereto an external ROM 7 for expansion.

Figure 4:
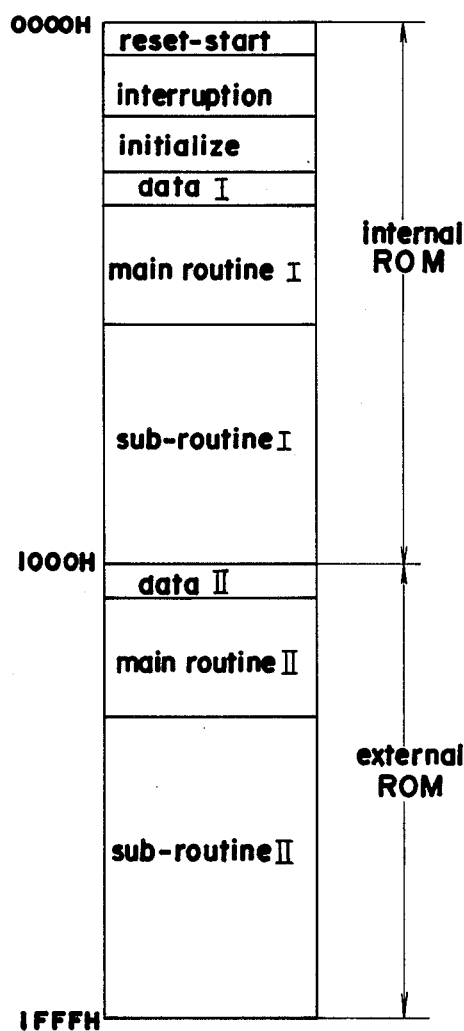
FIG. 4 is a diagram showing a program structure for use in the microcomputer system of the invention.

FIG. 4 shows a program structure for use in the microcomputer system shown in FIG. 3. The internal ROM 3 is assigned an address space for 0000H address to 0FFFH address and has stored therein a reset-start address with a jump destination address written therein for reset-start, a routine for an interruption, a routine for initialization, comparison data I, a main routine I and a subroutine I. The external ROM 7 is assigned an address space for 1000H address to 1FFFH address and has stored therein comparison data II, a main routine II and a subroutine II.

Figure 5:
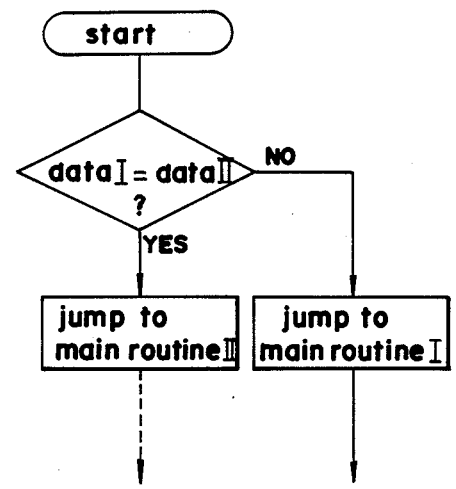
FIG. 5 is a flow chart showing a process for controlling the microcomputer of the invention in the initial stage of its operation.

The program described above and stored in the internal ROM 3 can be executed independently in its entirety even when the external ROM 7 is not connected to the MC 1. For example, when the power supply or reset switch is turned on, the MC 1 performs the program first at the reset-start address in the internal ROM 3, and with reference to the head address of the main routine I written in the reset-start address, the flow of program jumps to the main routine I. In the main routine I, the initialization routine is first executed, in which the contents of the comparison data I of the the internal ROM 3 are compared with those of the comparison data II of the external ROM 7 as shown in the flow chart of FIG. 5. If no coincidence is found therebetween, the program of the internal ROM 3 only is performed, neglecting the presence of the external ROM 7. When the comparison data I is found coincident with the comparison data II in contents, this is interpreted as indicating that the proper external ROM 7 is connected to the MC 1, whereupon the program jumps to the main routine II. The system to be controlled is thereafter controlled entirely according to the main routine II. The main routine II is intended to give an expanded function to the system and is a program for performing both the expanded function and the required functions included in the original functions to be afforded by the internal ROM 3. The main routine II is so programmed as to call the subroutine I or II as desired and to utilize other parts of the program within the internal ROM 3 when so required. Accordingly, the system is controlled according to the main routine I of the internal ROM 3 when the external ROM 7 is not connected to the MC 1, whereas when the external ROM 7 is connected, the system as expanded is controlled primarily according to the main routine II. in Copying systems can therefore be altered in specifications or given an improved function easily by adding such an external ROM 7 to the MC of the system. Further in the case where bugs are found in the program within the internal ROM 3, a countermeasure can be readily taken by adding an external ROM 7 wherein a program for avoiding the bugs is stored without the necessity of modifying the internal ROM 3 Since it is impossible for a third party to read out the contents of the internal ROM 3 which is in the form of a mask ROM included in a one-chip MC, the third party is unable to read out the entire program, which can therefore be held confidential, even when the external ROM 7 is added.

In the above embodiment, the comparison data I may be incorporated in the main routine I, provided that the comparison data II can be recognized thereby as particular data The address construction for the main routines I and II or the subroutines I and II may be altered suitably. Other external ROMs may be made usable as added to the external ROM 7, such that the program flow jumps from the main routine of one external ROM to that of another external ROM. Various means such as electric wire, printed board, connector and socket are usable for connecting the internal bus 5 to the external bus 6 and for connecting the external bus 6 to the external ROM 7. The external ROM 7 may be replaced by an external RAM into which a suitable program is loadable.

Figure 6:
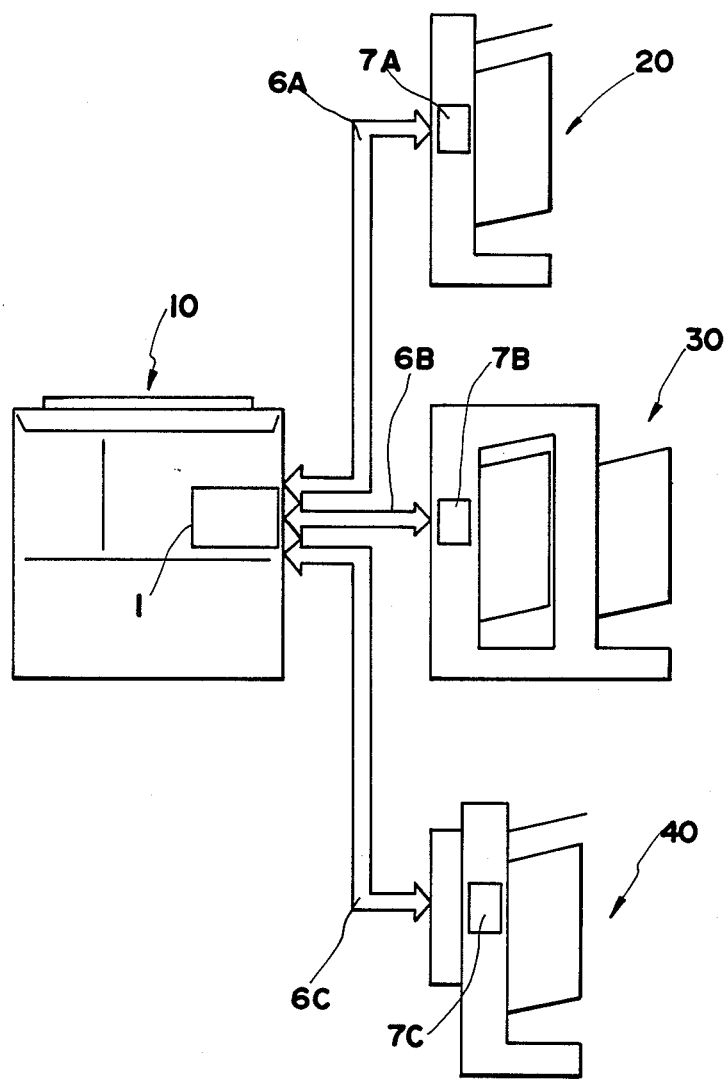
FIG. 6 is a diagram showing a copying system embodying the invention.

FIG. 6 shows a copying system embodying the present invention. Indicated at 10 is a copying machine, to which one of sorters 20, 30 and 40, which are different in function, is connectable.

The copying machine 10 has the MC 1 shown in FIG. 3, while the sorters 20, 30, 40 are respectively provided with external ROMs 7A, 7B, 7C and external buses 6A, 6B, 6C for connecting the external ROM to the MC 1. The sorter 20 has 20 bins, the sorter 30 has 40 bins, and the sorter 40 has 20 bins and the face-down function of positioning paper with its record bearing surface down. Since the sorters differ in specifications and function, there arises a need to modify the contents of the main routine I for controlling the copying machine 10, for example, when to set a copy flag for the next copying cycle during multi-copying operation, for use with the different sorters. However, the sorters 20, 30, 40 have the external ROMs 7A, 7B, 7C, respectively, each containing a main routine II which is modified in conformity with the specifications and function concerned, so that any of the sorters is connectable to the copying machine 10 without the necessity of replacing the MC 1 of the machine 10. The external ROM 7 is connected to the MC 1 usually by a serviceman, who generally handles a wide variety of copying machines. It is then likely that an improper external ROM will be connected to a particular copying machine, possibly breaking the MC 1 or the copying machine. Nevertheless, when different items of comparison data for establishing compatibility, are used for different kinds of copying machines, such objection is avoidable.

Although the present invention has been fully described by way of examples with reference to the accompanying drawings, it is to be noted that various changes and modifications will be apparent to those skilled in the art. Therefore, unless otherwise such changes and modifications depart from the scope of the invention, they should be construed as being included therein.

What is claimed is:

1. A programmed control device for copying machines comprising:
   a control unit including a read only memory storing a main program for general control of the machine and a subprogram for special control of a special portion or function of the machine, and a processing means for processing the control of the machine according to programs;
   an external memory capable of connecting to the control unit and storing an identification data and a substitute program which is modified in part from the main program of the read only memory, the substitute program being used as a substantial duplicate of the main program when the external memory is connected to the control unit; and
   means operatively connected to the control unit for discriminating the connection of the external memory by confirming the identification data and for overriding the execution of the main program to enable the processing means to control the copying machine by use of the substitute program when the external memory is connected.

2. A programmed control device as claimed in claim 1, wherein the discriminating means is constituted as a start program contained in the read only memory.

3. A programmed control device as claimed in claim 2, wherein the start program contains a discrimination data and the identification data in the external memory to be connected is established as equal to the discrimination data so as to confirm the connection of adequate external memory.

4. A programmed control device for copying machines comprising:
   a microcomputer including a read only memory storing a main program for general control of the machine, a subprogram for special control of a special portion or function of the machine and a start program and a central processing unit for processing the control of the machine according to programs, the read only memory and the central processing unit being composed integrally on the microcomputer;

an external memory capable of connecting to the microcomputer and storing an identification data and a substitute program which is modified only in part from the main program of the read only memory, the substitute program being used as a substantial duplicate of the main program when the external memory is connected to the microcomputer;

means for interconnecting the external memory to the microcomputer, and means for overriding the execution of the main program to enable control of the copying machine by the substitute program, wherein the start program discriminates the connection of the external memory according to the identification data and, when the external memory is connected, causes the central processing unit to control the machine by use of the substitute program instead of the main program.

5. A programmed control device as claimed in claim 4, wherein the start program contains a discrimination data and the identification data in the external memory to be connected is established as equal to the discrimination data so as to confirm the connection of adequate external memory.

6. In a copying machine system having a copy machine for producing copies of an original document in accordance with a control system which includes a computer processor unit with a first memory unit and a first stored program for controlling the operation of the copying machine, the improvement comprising:

an assessory unit that can be operatively connected to the copying machine to interact in a copying mode of operation, with the copying machine;

a second memory unit in the assessory unit;

a second program stored in the second memory unit substantially duplicating the first stored program;

means for interconnecting the second program with the copy machine computer processor unit; and means for overriding the execution of the first stored program to enable the control of the copying machine by the second stored program.

7. The invention of claim 6 wherein the means for interconnecting further includes means for verifying the content of the second stored program.

* * * * *